D. CLARK.
COAL-BREAKER.

No. 174,719. Patented March 14, 1876.

WITNESSES:
A. W. Almquist
John Goethals

INVENTOR:
D. Clark
BY Munn
ATTORNEYS.

UNITED STATES PATENT OFFICE.

DAVID CLARK, OF HAZLETON, PENNSYLVANIA.

IMPROVEMENT IN COAL-BREAKERS.

Specification forming part of Letters Patent No. 174,719, dated March 14, 1876; application filed January 22, 1876.

*To all whom it may concern:*

Figure 1:
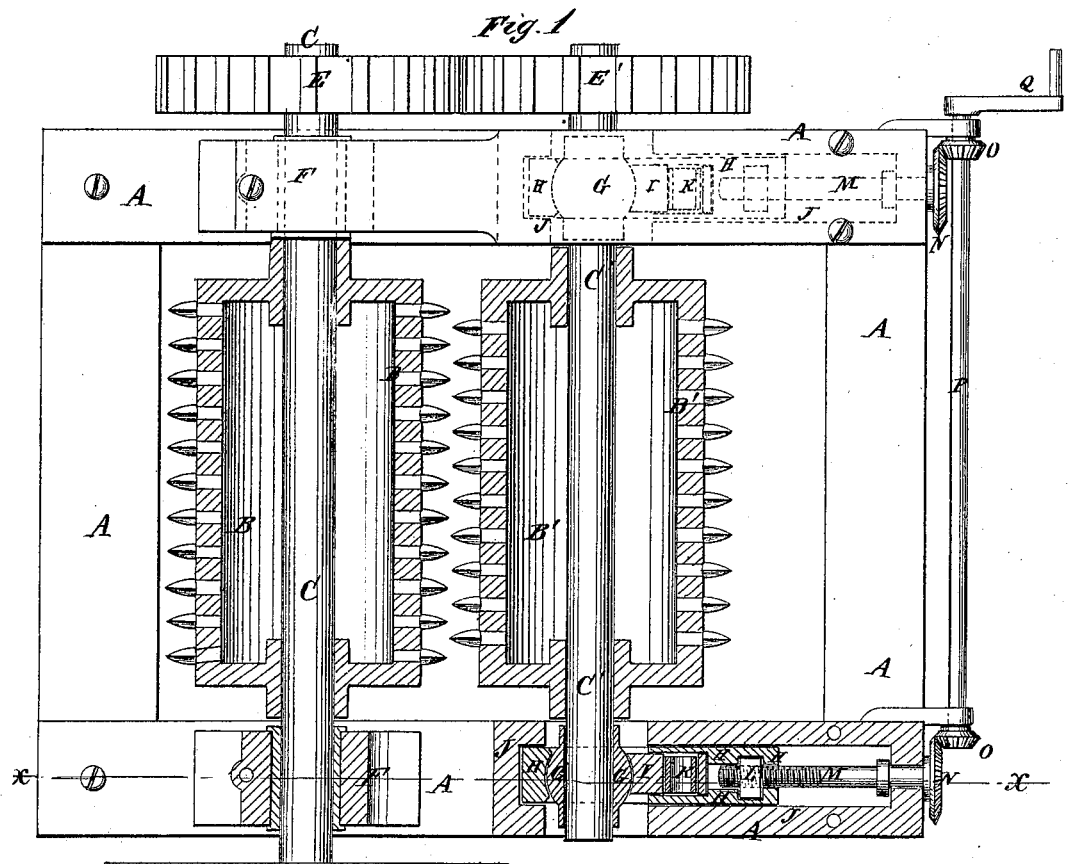
Figure 2:
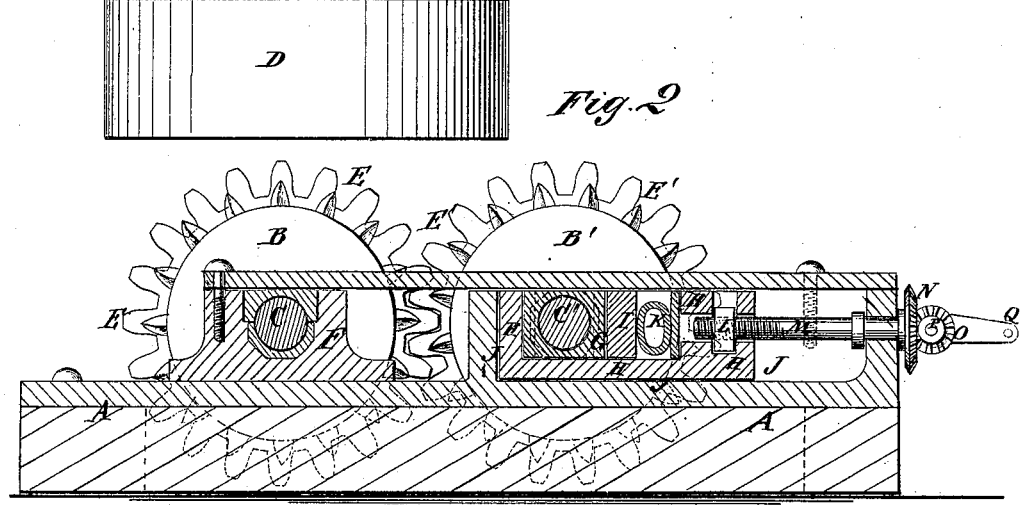
Figure 3:
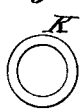
Figure 4:

Be it known that I, DAVID CLARK, of Hazleton, in the county of Luzerne and State of Pennsylvania, have invented a new and useful Improvement in Coal - Breakers, of which the following is a specification:

Figure 1 is a top view of a coal-breaker to which my improvement has been applied, partly in section, to show the construction. Fig. 2 is a detail section of the same, taken through the line $x\ x$, Fig. 1. Figs. 3 and 4 represent modified forms of the safety devices.

Similar letters of reference indicate corresponding parts.

The object of this invention is to furnish coal-breakers which shall be so constructed that, should any substance harder than coal or slate pass into them, they will give way in such a manner as to diminish the damage to and facilitate the repairing of the breakers, and thus lessen the cost of repairing, and the loss of time from the stopping of the works, while at the same time the rolls shall be held firmly to their places when at work.

The invention will first be described in connection with drawing, and then pointed out in the claim.

A represents the frame of the breaker, and B B' are the rolls, which are made hollow, and have steel teeth driven into holes formed in them, so that, should any of the teeth be broken, their shanks may be driven into the cavity of said rolls, and new teeth be driven into said holes. The rolls B B' are attached to shafts C C', the journals of which revolve in bearings attached to the side bars of the frame A. The shaft C revolves in stationary bearings F, and to one of its ends is attached the pulley D, to receive the driving-belt. To the other journal of the shaft C is attached a gear-wheel, E, the teeth of which mesh into the teeth of a gear-wheel, E', attached to the journal of the other shaft C'.

The teeth of the gear-wheels E E' are made long, so that they will mesh into each other when the breaker is adjusted to make coarser or finer coal.

The journals of the shaft C' revolve in oscillating bearings G, placed in a box, H, which is placed in a slot or cavity, J, in the side bars of the frame A. The inner sides of the bearings G rest against the concaved inner surface of the inner end of the boxes H, and their outer sides rest against the concaved surface of the blocks I, placed in the outer part of the boxes H. The outer sides of the blocks I rest against the safety devices K, which are made of cast-iron, and which may be made in the shape of short oblong tubes, as shown in Fig. 2, circular tubes, as shown in Fig. 3, or elliptical tubes, as shown in Fig. 4.

The safety devices K are made of such a strength as to hold the roll B' rigidly to its place while coal and slate are passing through the breaker; but should any harder substance pass into it, one or both the devices K will break, and allow the said roll B' to move back, and thus prevent it from being broken. Should only one of the safety devices K break, the oscillating bearing G will allow one end of the shaft C' to move back without bending or breaking said shaft.

In the outer ends of the boxes H are formed, or to them are secured, nuts L, in which work the screws M, which are swiveled to the outer ends of the side bars of the frame A, and to their outer ends are attached bevel - gear wheels N, the teeth of which mesh into the teeth of the bevel-gear wheel O, attached to the shaft P.

The shaft P revolves in bearings attached to the frame A, and to its end is attached a crank, Q, so that by turning the said crank Q the roll B' may be moved closer to or farther from the roll B, to make finer or coarser coal, as may be desired.

With this construction, should a substance harder than coal or slate get into the breaker and break the safety devices K, the roll will be thrown out of gear, and will remain out of gear until the damage is repaired and the said roll again adjusted in place. This guards against the rolls ever getting into such a relative position that their points or teeth will not come into proper position in the spaces between each other, so as to prevent them from striking against each other and being broken, and to prevent them from making uneven coal.

Having thus described my invention, I claim as new and desire to secure by Letters Patent—

The safety devices K, made of cast-iron and hollow, in combination with the bearings of a coal-breaker roll, substantially as herein shown and described.

DAVID CLARK.

Witnesses:
 T. M. SANTEE,
 JNO. L. POLEN.